W. R. DE CAMP, H. BURDICK & J. H. DOOLEY.
TOTALIZING MEANS FOR CALCULATORS.
APPLICATION FILED SEPT. 8, 1915.
1,232,007.
Patented July 3, 1917.
4 SHEETS—SHEET 4.
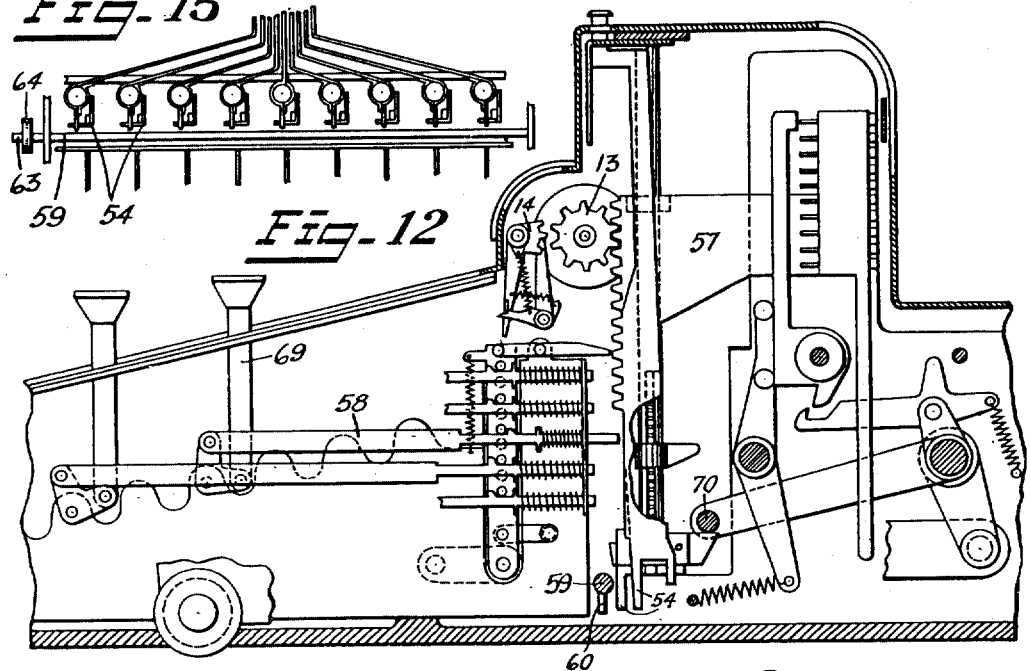
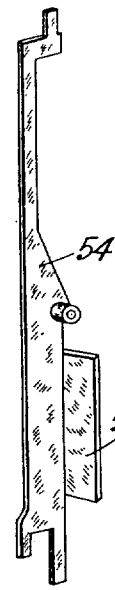
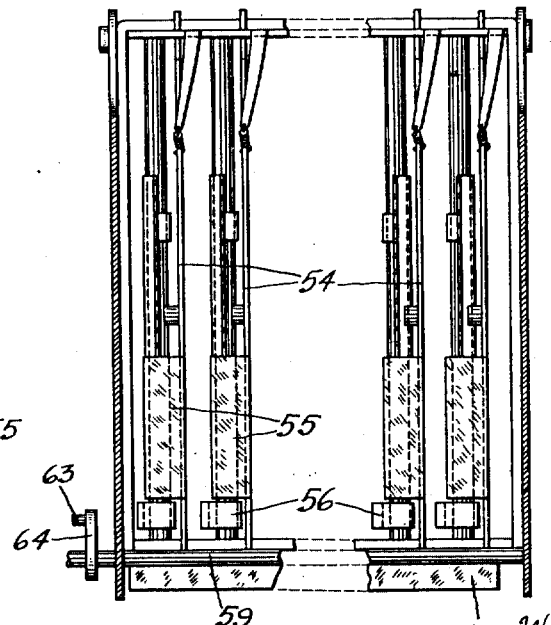

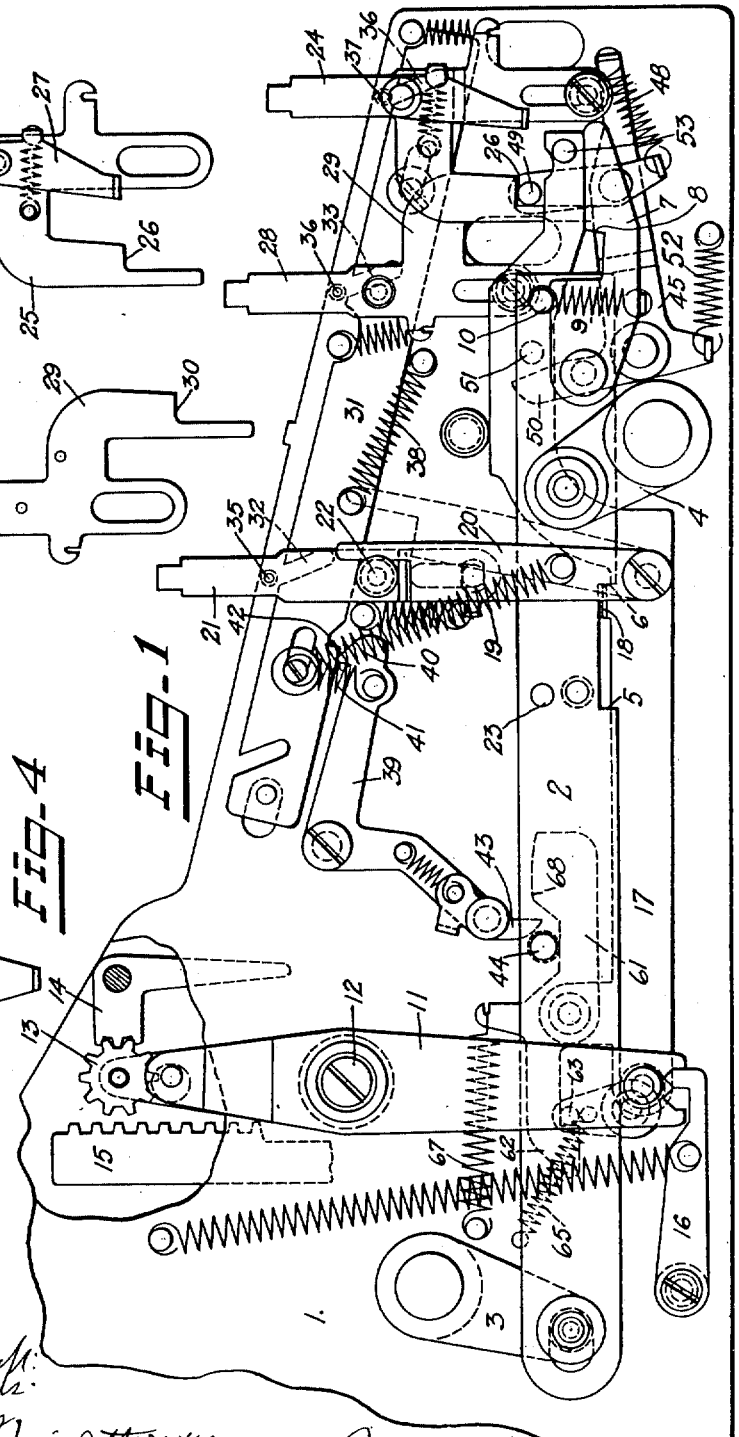

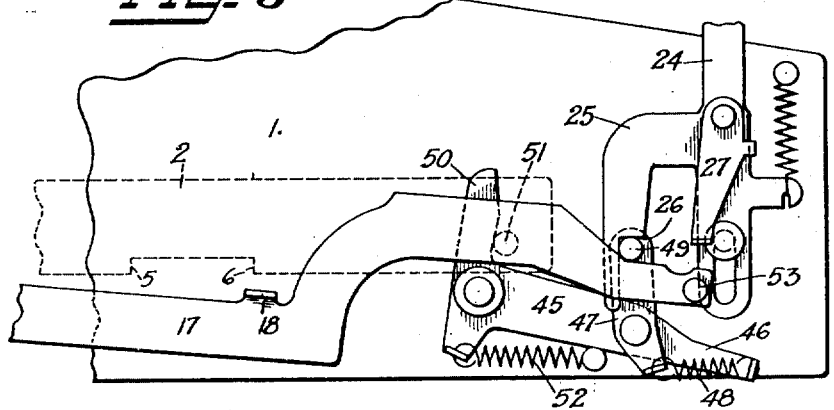
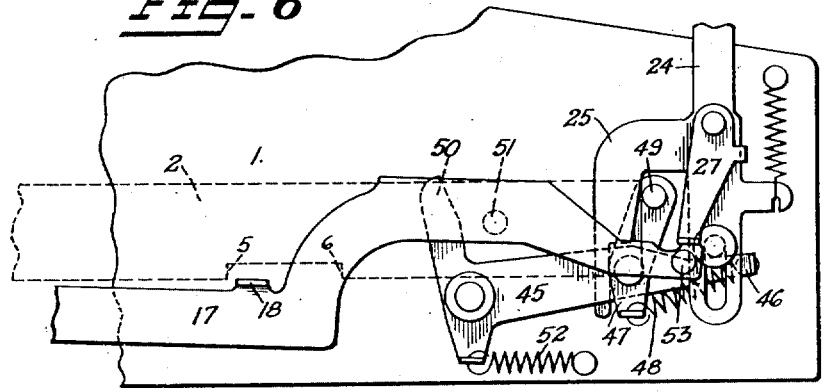
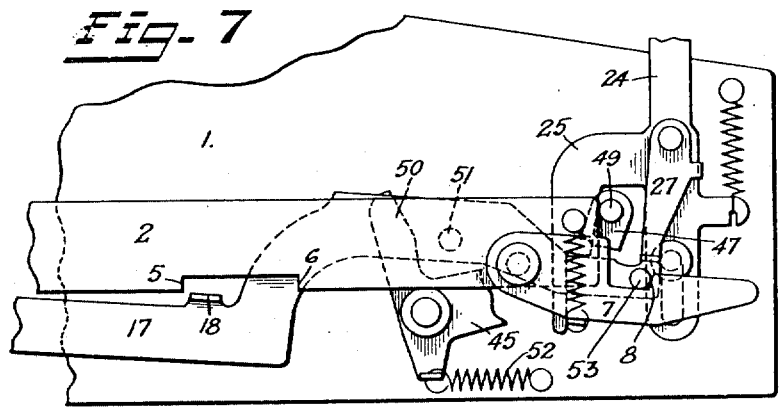

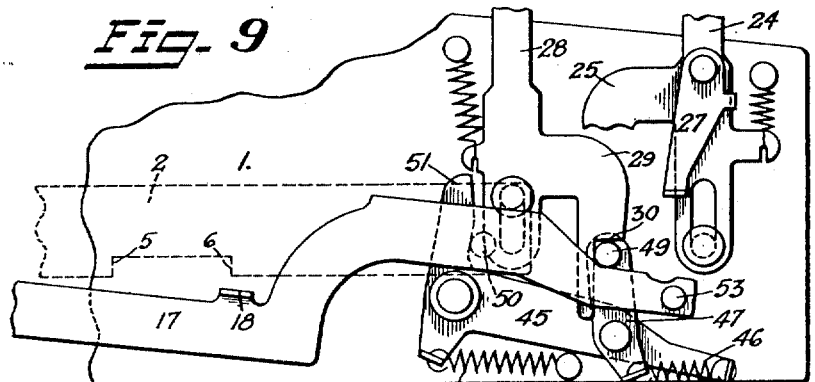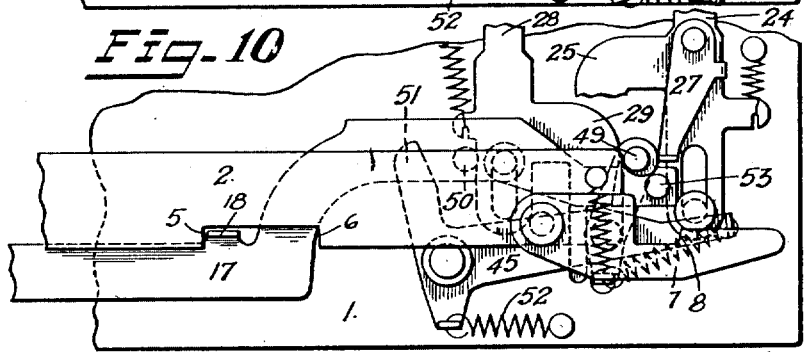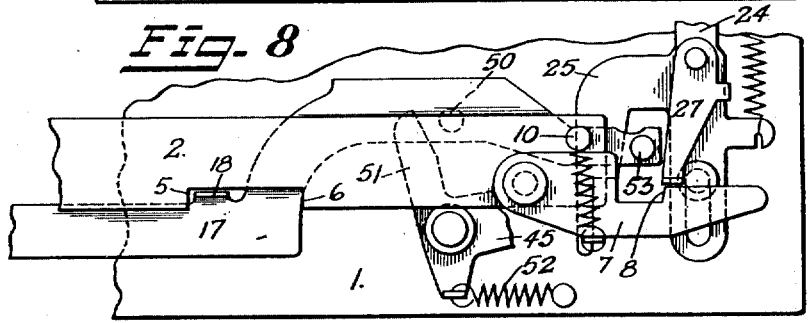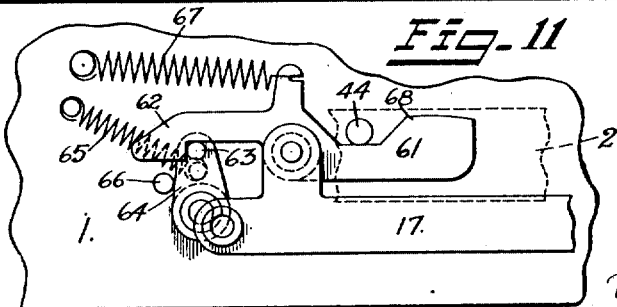

UNITED STATES PATENT OFFICE.

WITSEL R. DE CAMP, OF ROSELAND, AND HERBERT BURDICK AND JAMES H. DOOLEY, OF EAST ORANGE, NEW JERSEY, ASSIGNORS TO ADDOMETER CORPORATION, OF NEW YORK, N. Y., A CORPORATION OF DELAWARE.

TOTALIZING MEANS FOR CALCULATORS.

1,232,007. Specification of Letters Patent. Patented July 3, 1917.

Application filed September 8, 1915. Serial No. 49,444.

*To all whom it may concern:*

Be it known that we, WITSEL R. DE CAMP, a citizen of the United States, and a resident of Roseland, county of Essex, and State of New Jersey, HERBERT BURDICK, a citizen of the United States, and a resident of East Orange, county of Essex, and State of New Jersey, and JAMES H. DOOLEY, a citizen of the United States, and a resident of East Orange, county of Essex, and State of New Jersey, have invented certain new and useful Improvements in Totalizing Means for Calculators, of which the following is a specification.

This invention has for its object to provide an improved construction of totalizing means for a calculator, whereby the timing of the engagement and disengagement between the adding pinions and their actuating rack bars, is changed; and which includes means for also taking the sub-total by still further changing such timing operation.

A further object of the invention is to provide in such a mechanism, means whereby should the total key, or the sub-total key, be held in the depressed position, and the handle or prime mover be given additional movements after the proper movement to effect the total or the sub-total operation, there will be absolutely no derangement of the parts of the machine, and no effects will be produced in either the adding or the printing mechanism.

Another object of the invention is to provide in connection with the described mechanism, an improved form of non-add or elimination key, that will prevent the adding pinions being brought into engagement with the rack bars when depressed; and which device, upon such key being retained depressed, and the handle or prime mover being given subsequent operations after the normal operation, no derangement of the parts of the machine will be effected, and no special results will be produced.

A further object of the invention is to provide, in connection with the locking means that serve to hold the racks in normal position except when released by item keys, means whereby upon depression of the total key, or of the sub-total key, such locking means are at once released; to thereby permit all of the racks being elevated when the universal bar moves upward by the operation of the prime mover.

In the accompanying drawings illustrating one embodiment of my invention, Figure 1 is an elevation showing one of the side plates with the total mechanism included therewith. Fig. 2 shows the sub-total key. Fig. 3 shows the total key. Fig. 4 shows the lever that is swung by the total and sub-total keys. Fig. 5 shows the total key and connected parts, when the key is first depressed. Fig. 6 is a view similar to Fig. 5 with the pitman advanced, but with the latch omitted. Fig. 7 is a view similar to Fig. 6 showing the latch on the pitman. Fig. 8 is a view similar to Fig. 7, with the pitman slightly retracted. Fig. 9 is a view showing the sub-total key depressed and the adjacent parts in corresponding position. Fig. 10 is a view similar to Fig. 9 at a later stage with the pitman and latch advanced. Fig. 11 is a detail showing the means for swinging the shutter to release the latch plates and rack bars. Fig. 12 is a partial side elevation of the opposite side of the machine. Fig. 13 is a partial transverse section showing the rack bars and the shutter. Fig. 14 is a plan of the parts shown in Fig. 13; and Fig. 15 shows one of the latch plates.

As shown in the several views, on the left hand side of plate 1 is mounted a pitman 2 that moves back and forth at each operation of a handle or prime mover. The pitman is shown as supported from cranks 3 and 4 at its end portions respectively, crank 4 being the actuating member. The pitman is provided with a notch on its lower edge forming shoulders 5 and 6 at the end portions. At its front end the pitman carries a latch 7 provided with a hook portion 8, the latch being pressed by spring 9 against a pin 10 on the pitman to hold it normally in the position shown, but permitting the latch to be swung downward.

On the side plate an upright lever 11 is pivoted at 12, to swing back and forth, and its upper end connects with a carrier for the pinions 13, that as shown in Fig. 1 are normally held forward to engage carrying segments 14; and when this lever is rocked the pinions are carried rearward to leave the segments and engage the racks 15. The lever is locked in these two positions by a spring-controlled arm 16 engaging two notches in its lower extremity. In the normal operation of machines of this character, by the operation of adding and listing, the pinions are held free from the racks until the racks have risen according to the keys depressed, which is generally done during the forward stroke of the pitman. Thereupon the pinions are brought to engage the racks, and the downward movement of the racks will turn the pinions the proper distance. But to take a total, the pinions are thrown into engagement with the racks before the racks move upward and hence the pinions rotate reversely to the zero positions thereof, on the upward movement of the racks, that will set the racks to bring their printing portions to the proper position to print the total. This is usually done at the forward stroke of the pitman. The pinions being now all at zero, at the end of this forward stroke they are swung away from the racks and the racks are returned to normal position, which is the usual "clearing" operation. To perform the sub-total operation, the pinions are brought to engage the racks before the latter rise, and the pinions will return to zero when the racks rise and position the racks for printing the total amount. But in this operation the pinions are retained engaging the racks during the depression of the racks, and the pinions are moved from the zero position to that of the total that was printed, that is of the positions they occupy at the beginning of this sub-total operation, and thus the total is retained in the machine, to receive subsequent additions.

To the lower end of the upright lever 11 is pivoted a shifting bar 17 by its rear end, which bar carries a lug 18 that is swung up into the slot in the pitman 2 between the shoulders 5 and 6, by a spring 19 suitably connected with the bar 17. As shown an arm 20 is pivoted to the bar 17 and projects upwardly to coöperate with the non-add key 21, hereinafter set forth, the spring 19 being attached to this arm 20. In the normal operation of the machine, when the pitman 2 moves forward, at the end of such stroke the shoulder 5 will engage the lug 18 to move the bar 17 forward and swing the lever 11 to engage the pinions with the racks. At the conclusion of the return stroke of the pitman 2, the shoulder 6 will strike the lug 18 and shift the bar 17 rearward, to swing lever 11 and bring the pinions 13 forward free from the racks. When the non-add key 21 is depressed, a stud 22 thereon will engage the upper end of the arm 20 to depress the bar 17 and bring its lug 18 out of range of the shoulders 5 and 6 of the pitman. This will prevent the shoulder 5 engaging the lug 18 on the forward stroke. But at the conclusion of the forward stroke of the pitman 2, a stud 23 on the pitman will strike the arm 20 and swing the arm forward free from the stud 22, which is done after the shoulder 5 has passed over the lug 18, thereby permitting the bar 17 to swing upwardly on shoulder 5; and on the return stroke as soon as the shoulder 5 passes rearward beyond the lug 18, the bar 17 will swing upward to normal position. The purpose of this will appear hereinafter.

At the front of the machine is a total key comprising a stem 24 (see Fig. 3), and an arm 25 provided with a shoulder 26. The stem 24 has pivoted thereto an arm 27. To the rear of the total key is a sub-total key comprising a stem 28, (see Fig. 2), and an extension 29 having a shoulder 30. In the normal position of these two key stems, their extensions are positioned to cause the shoulders 26 and 30 to register, as indicated in Fig. 1. These keys are provided with the usual springs to retract them when depressed and released. They are also provided with means for locking them, as well as the key stem 21, in the depressed position until the return of the pitman 2. The means shown comprises a slide 31 provided with inclined slots 32, 33 and 34, arranged to be engaged by pins 35, 36 and 37 respectively in the three key stems. It will be seen that when either of these key stems is depressed the slide 31 will move rearward and tension its spring 38, that will retract the slide when released. On the side plate 1 is pivoted a bent lever 39 whose hook portion 40 is swung by a spring 41 to engage a shoulder 42 in the slide 31, when the slide is shifted by a depressed key; which lever serves to hold the slide advanced to retain any key stem depressed. The lever 39 carries a latch 43 that is tripped by stud 44 on the pitman 2 during its forward stroke; but when the pitman is returned the stud 44 will strike the latch 43 and swing the lever 39 to move the hook 40 away from the shoulder 42 of the slide 31, permitting the slide to be retracted by spring 38, and the key stem to rise.

On the side plate 1 near the pitman is pivoted a bent lever 45, (see Fig. 4), having one arm 46 extending forwardly and carrying a swinging arm 47. This arm projects upwardly and is pressed by a spring 48 to bring a pin 49 on its upper end to engage the shoulder portions 26 and 30 of the total and sub-total keys; the arm being able to swing forward to bring the pin 49 free from the shoulders of both keys; by means later set forth. At the rear this lever 45 has an upright arm 50 that normally lies a short distance back of a pin 51 carried by the bar 17. A spring 52 on the lever 45 tends to return it to the position indicated in Fig. 1, with the arm 50 offset a short distance from the pin 51. The forward extremity of the bar 17 carries a pin 53 that is arranged to be engaged by the hook portion 8 of the latch 7.

When the total key 24 is depressed, the shoulder 26 engaging the pin 49 on the arm 47 carried by the lever 45, will at once swing this lever, (see Fig. 5). But the pin 49 also extends across the upper edge of the bar 17, and this bar will be at once moved downward, that will bring the lug 18 out of the notch in the pitman 2. When the latter movement is accomplished, the arm 50 of the lever will have swung forward to engage the pin 51 on the bar 17, and the continued swinging of this lever 45 and arm 50 will draw the bar 17 forward, that will swing lever 11 and shift the pinions 13 from the carrying segments 14 into mesh with the racks 15.

This same movement will bring the pin 53 on the bar 17 down against the latch 7 on the pitman and swing it slightly downward. The total key will be locked in the depressed position by the slide 31 and lever 39, as set forth. It will thus be seen that the act of depressing the total key at once shifts the pinions into engagement with the rack bars, and this is previous to any movement of the pitman or prime mover of the machine.

The parts being held in these positions by the locked depressed total key 24, the handle is pulled and the pitman 2 makes its forward stroke. At the latter portion of such stroke the front end of the pitman will strike the pin 49 on arm 47 and swing the arm until this pin moves away from the shoulder 26 of the total key 24. This will free the lever 45, whereby its spring 52 can retract the lever, and the pin 49 will move upwardly along the front edge of the total key extension 25, as indicated in Fig. 6. The upward movement of pin 49 would tend to release the bar 17 held depressed by this pin, but the depressed key stem 24 now has the arm 27 thereon in position to engage the top of the front end of the bar 17, and such bar is thereby held in the depressed position. This will permit the hook portion 8 of the latch, now brought forward by the pitman 2, to engage the pin 53 on the front end of the bar 17, (see Fig. 7). As soon as the pitman starts its return movement, the hook 8 engaging this pin 53 will move the bar 17 rearwardly, that will swing the upright lever 11 and shift the pinions forward from the racks to again engage the segments 14. The pitman has a considerable range of movement back and forth, much greater than that of the bar 17, but this rearward movement of the bar 17 will bring its forward end away from the arm 27 that held it depressed, after a very short rearward movement of the bar 17, just sufficient to shift the pinions; and this release of the forward end of the bar 17 will permit it to be drawn upwardly by the spring 19, whereby the pin 53 on the bar will be moved up free from the hook 8, now held by pin 10, and the return of the hook and pitman is thereby permitted, (see Fig. 8). It was stated that when the pin 49 on the arm 50 moved forward to release the lever 45, the latter returned to normal position. All of the parts are now in normal position, except the total key, and as stated the lever 39 is swung at the final movement of the pitman 2 rearward, whereby the total key is released to return to normal position.

In the operation of the sub-total key 28, when depressed its shoulder 30 will at once move the pin 49 and arm 45 downward, to first swing the bar 17 downward, moving lug 18 out of range of shoulders 5 and 6 and will then bring the arm 50 to engage the pin 51 on the bar and move the bar forward. This will shift the pinions into the racks, as was done by the total-key, and the depression of the pin 53 on the forward end of the bar 17 will swing down the latch 7 as with the total key, (see Fig. 9). The sub-total key is locked in this position by the lever 39. The advance of the pitman at this time will bring its forward end to engage the pin 49 and swing it and the arm 47 forward away from the shoulder 30 of the sub-total key, thereby permitting the lever 45 to swing upward, and its arm 50 to move rearward away from the pin 51 on the bar 17. (See Fig. 10). This upward movement of the pin 49 and arm 47 will permit the bar 17 to also move upward. When the total key was depressed, its arm 27 served to hold the bar 17 depressed at this stage, but since the total key is not now depressed, this arm 27 will not now interfere, and the forward end of the bar 17 will swing upwardly to normal position, that is entirely free from the latch 7 on the pitman. Therefore retraction of the pitman 2 and the latch at this stage cannot serve to draw the bar 17 rearward, and the pinions must remain in engagement with the rack bars 15. Since the bar 17 is now swung upward, its lug 18 will enter the notch in the lower edge of the pitman, and at the final portion of the return stroke of the pitman, this lug 18 will be engaged by the shoulder 6 of the pitman, that will move the bar 17 rearward, and swing the lever 11 to bring the pinions forward away from the racks to engage the segments. The return of the pitman will swing lever 39 to release the depressed sub-total key, that will return to normal position.

When the non-add key 21 is depressed and held down, as stated, the lug 18 is free from the shoulder 5 on the forward stroke. At the latter portion of the pitman advance stroke, as soon as arm 20 is swung by stud 22 and released to permit the bar 17 to rise, the lug 18 will strike the edge of the bar just to the rear of the shoulder 5. The bar 17 being depressed, this pin 53 at its front end, would engage the hook 8 on the latch 7. Since the bar 17 was not moved forward, the latch must move rearward a short distance before it would strike the pin 53, but this movement will bring the lug 18 to register with the slot adjacent the shoulder 5, thus permitting the bar 17 to swing upwardly its full distance and disengage the pin 53 from the hook 8, and prevent any interference with the rearward movement of the pitman by this latch and the pin 53.

Means are further provided in connection with the total and sub-total mechanism, for shifting the shutters or other locking means for the rack and type plates, that serve to prevent these plates rising at each movement of the universal bar. The present means for this purpose is designed to coöperate in connection with the form of latch plates set forth in patent to J. C. Lotterhand 1,102,157. In Figs. 13 and 14 are shown latch plates 54 that each have an extension 55 normally held above a shoulder 56 on the rack and type plates 57. When the stop bar 58 is advanced by a key 69 the bar will strike extension 55 and the latch plate is moved rearward, that will permit the selected rack and type plate to rise when the universal bar 70 moves upward. But in the taking of a total or a sub-total, it is necessary to release all the latch plates 54 at once to permit them to rise as soon as the universal bar is moved upward by the handle or motor shaft. In front of the latch bar is arranged a shaft 59 extending across the machine, and carrying a shutter 60, that when the shaft is rocked will swing all of the latch plates back out of engaging position with the rack and type plates. On the bar 17 near its rear end is pivoted a lever 61, having a hook portion 62 normally in engagement with a pin 63 carried by an arm 64, the latter being secured on the extremity of the shaft 59. The arm 64 is normally held by spring 65 against a pin 66 on the side plate, in which position the shutter 60 will engage all of the latch plates 54. The hook 62 is retained in engagement with the pin 63 by a spring 67 on the lever 61, and therefore when the bar 17 is moved forward, by operation of the total or the sub-total key, the advance of the bar 17 will move the lever 61 forward and the shaft 59 will be rocked to swing the shutter to move the latch plates free from the rack and type plates, and the shutter will be retained in this position by the bar 17, until the lever 61 is swung. The stud 44 on the pitman 2, when the pitman is advanced, will strike a cam portion 68 of the lever 61 and swing the lever on the bar 17, whereby its hook will move upward and release the shaft 59, thus permitting the shaft to swing and return the shutter 60 to normal position, while the bar 17 is still advanced. When the bar returns, the spring 67 will swing the lever 61 after the hook passes back of the pin 63, and the latter will reëngage.

It will be understood that should either the total key or the sub-total key be depressed, and retain depressed throughout the entire movement of the operating handle or motor shaft, the proper or normal operation will take place. It will be further seen that if the total key is held depressed and then the handle pulled or the motor shaft actuated for the second stroke, none of the parts will interfere to cause the machine to bend or break, or to lock in position that will not return to normal when the total key is released. If the total key is held down after the pitman is advanced and returned, it will be remembered that the pin 49 on the swinging arm 47 is forward along the front edge of the extension 25 of this key stem. By reason of this position the bar 17 will be in its uppermost position, and the lever 45 will not be swung by the subsequent movement of pitman 2 but will remain in normal position. The lug 18 on the bar will be engaged by the shoulders 5 and 6 on this second movement of the pitman, and the advance of the front extremity of the bar 17 will strike the movable arm 27 on the total lever, that will yield and prevent any derangement of parts. Since the bar 17 is in its uppermost position, the pin 53 on its front end will not be engaged by the latch hook 8 when the pitman advances.

Should the sub-total key be held depressed after the regular operation of the pitman and other parts, the pin 49 on the arm 50 will be held forward along the edge of the extension 29, and the bar 17 will remain in its uppermost position, and on further movement of the pitman, the operation of the parts will be the same as just described with reference to the total key.

Should the non-add key 21 be held depressed, it will be understood that the stud 22 will strike the arm 20 during the forward stroke and swing it away from the stud 22 and these two parts will remain disconnected until the key 21 is permitted to rise. Therefore the bar 17 will return to normal position and the lug 18 be engaged by the shoulders 5 and 6.

It will be understood that during the normal operation of the machine, the bar 17 is in its elevated position with the lug 18 arranged to be engaged by the shoulder 5 at the final portion of the forward stroke of the pitman, and by the shoulder 6 at the latter portion of the return stroke of the pitman. This will engage the pinions with the rack bars at the end of the forward stroke of the pitman, and return the pinions to engage the segments and free the rack bars at the end of the return stroke. Thus the bar 17 is not advanced until the latter portion of the advance of the pitman, when neither the total nor the sub-total keys are depressed, and hence the stud 44 on the pitman will strike the lever 68 and swing the hook 62 up free from the pin 63 on the arm 64. The parts will assume this position before advance of the pitman, and remain in such position until the latter portion of the retraction of the pitman. Therefore when the bar 17 is moved forward at the latter portion of the advance of the pitman, the advance of the lever 61 by the bar 17 will not cause the hook 62 to swing the arm and shift the shutter 60. Hence the latch plates 54 will not be swung rearward to release the rack and type plates, and the latter cannot rise when the universal bar moves upward; that is, so far as the shutter is concerned. As stated, in the normal operation of the machine, without depressing the total or sub-total keys, only those racks can rise where the latch plates are shifted by the advance of the stop bars 58, from item keys depressed. From this it will be understood that upon retaining the total key depressed after swinging of the handle or motor shaft, the second movement of the handle with the total key still depressed, will cause the pitman to advance the bar 17 only at the end of the forward stroke of the pitman, and as just stated the hook arm 62 has been released from the shutter, and none of the rack and type plates are released from the latch plates, and cannot be advanced to print. Therefore no printing whatever will take place after the printing of the total on the first operation of the handle, no matter how many times the handle is operated on retention of the total key depressed.

The same results follow on retention of the sub-total key depressed, as the bar 17 is in its normal position, and will be advanced only at the final part of the advance of the pitman, so that as set forth the shutter is not shifted to move the latch plates to release the rack and type plates.

It will be understood that holding the non-add key 21 depressed and pulling the handle repeatedly will have the same effect as the swinging arm 20 of this key is moved forward away from the stud 22 on the non-add key 21, and cannot reëngage while such key is held depressed. Therefore the bar 17 will be released to occupy its normal position, and the parts will operate as just set forth.

Having thus described our invention, what we claim is:

1. In a calculator, the combination with accumulating mechanism including rack bars, and numeral pinions, and means for causing engagement and disengagement of the pinions and rack bars during the normal operation of the machine by the prime mover to accumulate, of total mechanism including a total key that will change the timing of the said engagement and disengagement of the pinions and rack bars upon actuation of the prime mover, said mechanism including means for disconnecting parts of the total mechanism whereby upon the total key being retained depressed on completion of a total operation and return of the prime mover and other parts to normal positions and held depressed during the subsequent operation of the prime mover, no derangement or abnormal movements of any of the parts will result.

2. In a calculator, the combination with accumulating mechanism including rack bars, and numeral pinions, and means for causing engagement and disengagement of the pinions and rack bars during the normal operation of the machine by the prime mover to accumulate, of total mechanism including a total key that will change the timing of the engagement and disengagement of the pinions and rack bars upon actuation of the prime mover, said mechanism including means for disconnecting parts of the total mechanism whereby upon the total key being retained depressed on completion of a total operation and return of the prime mover and other parts to normal positions and held depressed during the subsequent operation of the prime mover, the normal engagement and disengagement of the rack bars and pinions will result on the repeated movements of the prime mover during such depression of the total key.

3. In a calculator, the combination with accumulating mechanism including rack bars, and numeral pinions, and means for causing engagement and disengagement of the pinions and rack bars during the normal operation of the machine by the prime mover to accumulate, of sub-total mechanism including a sub-total key that will change the timing of the said engagement and disengagement of the pinions and rack bars upon actuation of the prime mover, said mechanism including means for disconnecting parts of the sub-total mechanism whereby upon the sub-total key being retained depressed on completion of a sub-total operation and return of the prime mover and other parts to normal positions and held depressed during the subsequent operation of the prime mover, no derangement or abnormal movements of any of the parts will result.

4. In a calculator, the combination with accumulating mechanism including rack bars, and numeral pinions, and means for causing engagement and disengagement of the pinions and rack bars during the normal operation of the machine by the prime mover to accumulate, of sub-total mechanism including a sub-total key that will change the timing of the engagement and disengagement of the pinions and rack bars upon actuation of the prime mover, said mechanism including means for disconnecting parts of the sub-total mechanism whereby upon the sub-total key being retained depressed on completion of a sub-total operation and return of the prime mover and other parts to normal positions and held depressed during the subsequent operation of the prime mover, the normal engagement and disengagement of the rack bars and pinions will result on the repeated movements of the prime mover during such depression of the sub-total key.

5. In a calculator the combination with accumulating mechanism including rack bars and numeral pinions, and means for causing engagement and disengagement of the pinions and rack bars during the normal operation of the machine to accumulate, of total mechanism including a total key that will cause engagement of the pinions and rack bars at once on depression of said key, and which will change the timing of the said disengagement of the pinions and rack bars, said mechanism including means for disconnecting parts of the total mechanism whereby upon the total key being retained depressed on completion of a total operation and return of the prime mover and other parts to normal positions and held depressed during the subsequent operation of the prime mover, no derangement or abnormal movements of any of the parts will result.

6. In a calculator the combination with accumulating mechanism including rack bars and numeral pinions, and means for causing engagement and disengagement of the pinions and rack bars during the normal operation of the machine to accumulate, of total mechanism including a total key that will cause engagement of the pinions and rack bars at once on depression of said key, and which key will change the timing of the said disengagement of the pinions and rack bars, said mechanism including means for disconnecting parts of the total mechanism whereby upon the total key being retained depressed on completion of a total operation and return of the prime mover and other parts to normal positions and held depressed during the subsequent operation of the prime mover, the normal engagement and disengagement of the rack bars and pinions will result on the repeated movements of the prime mover during such depression of the total key.

7. In a calculator, the combination with accumulating mechanism including rack bars and numeral pinions, and means for causing engagement and disengagement of the pinions and rack bars during the normal operation of the machine to accumulate, of total mechanism including a total key that will cause engagement of the rack bars and pinions at once on depression of the key, and which key will change the timing of the disengagement of the pinions and rack bars upon actuation of the prime mover, said mechanism including means for disconnecting the total key during the total operation, that will remain disconnected until return of said key and the total mechanism to normal position, whereby upon the total key being retained depressed on completion of the total operation and return of the prime mover and other parts to normal positions and held depressed during the subsequent operation of the prime mover, no derangement or abnormal movements of any of the parts will result.

8. In a calculator, the combination with accumulating mechanism including rack bars and numeral pinions, and means for causing engagement and disengagement of the pinions and rack bars during the normal operation of the machine to accumulate, of total mechanism including a total key that will cause engagement of the rack bars and pinions at once on depression of the key, and which key will change the timing of the disengagement of the pinions and rack bars upon actuation of the prime mover, said mechanism including means for disconnecting the total key during the total operation, that will remain disconnected until return of the key and the total mechanism to normal position, whereby upon the total key being retained depressed on completion of the total operation and return of the prime mover and other parts to normal positions and held depressed during the subsequent operation of the prime mover, the normal engagement and disengagement of the rack bars and pinions will result on the repeated movements of the prime mover during such depression of the total key.

9. In a calculator the combination with accumulating mechanism including rack bars and numeral pinions, and means for causing engagement and disengagement of the pinions and rack bars during the normal operation of the machine to accumulate, of sub-total mechanism including a sub-total key that will cause engagement of the pinions and rack bars at once on depression of said key, and which will change the timing of the said disengagement of the pinions and rack bars, said mechanism including means for disconnecting parts of the sub-total mechanism whereby upon the sub-total key being retained depressed on completion of a sub-total operation and return of the prime mover and other parts to normal positions and held depressed during the subsequent operation of the prime mover, no derangement or abnormal movements of any of the parts will result.

10. In a calculator the combination with accumulating mechanism including rack bars and numeral pinions, and means for causing engagement and disengagement of the pinions and rack bars during the normal operation of the machine to accumulate, of sub-total mechanism including a sub-total key that will cause engagement of the pinions and rack bars at once on depression of said key, and which key will change the timing of the said disengagement of the pinions and rack bars, said mechanism including means for disconnecting parts of the sub-total mechanism whereby upon the sub-total key being retained depressed on completion of a sub-total operation and return of the prime mover and other parts to normal positions and held depressed during the subsequent operation of the prime mover, the normal engagement and disengagement of the rack bars and pinions will result on the repeated movements of the prime mover during such depression of the sub-total key.

11. In a calculator, the combination with accumulating mechanism including rack bars and numeral pinions, and means for causing engagement and disengagement of the pinions and rack bars during the normal operation of the machine to accumulate, of sub-total mechanism including a sub-total key that will cause engagement of the rack bars and pinions at once on depression of the key, and which key will change the timing of the disengagement of the pinions and rack bars upon actuation of the prime mover, said mechanism including means for disconnecting the sub-total key during the sub-total operation, that will remain disconnected until return of said key and the sub-total mechanism to normal position, whereby upon the sub-total key being retained depressed on completion of the sub-total operation and return of the prime mover and other parts to normal positions and held depressed during the subsequent operation of the prime mover, no derangement or abnormal movements of any of the parts will result.

12. In a calculator, the combination with accumulating mechanism including rack bars and numeral pinions, and means for causing engagement and disengagement of the pinions and rack bars during the normal operation of the machine to accumulate, of sub-total mechanism including a sub-total key that will cause engagement of the rack bars and pinions at once on depression of the key, and which key will change the timing of the disengagement of the pinions and rack bars upon actuation of the prime mover, said mechanism including means for disconnecting the sub-total key during the sub-total operation, that will remain disconnected until return of the key and the sub-total mechanism to normal position, whereby upon the sub-total key being retained depressed on completion of the sub-total operation and return of the prime mover and other parts to normal positions and held depressed during the subsequent operation of the prime mover, the normal engagement and disengagement of the rack bars and pinions will result on the repeated movements of the prime mover during such depression of the sub-total key.

13. In a calculator, the combination with accumulating mechanism including racks and numeral pinions, of a pitman arranged to reciprocate at each operation of the prime mover, a latch carried by the pitman, a shifting bar arranged to cause the pinions and racks to engage and disengage, a pin carried by the shifting bar arranged to be engaged by said latch, a total key stem, a swinging lever arranged to engage the shifting bar to advance it to engage the pinions and racks, means for swinging said lever to advance the bar and engage the pinions and racks by the depression of the total key stem, the shifting bar being swung on depression of the total key stem to position for engagement with said latch on advancement of the pitman, whereby on retraction of the pitman the shifting bar will be retracted to separate the pinions and racks.

14. In a calculator, the combination with accumulating mechanism including racks and numeral pinions, of a pitman arranged to reciprocate at each operation of the prime mover, a latch carried by the pitman, a shifting bar arranged to cause the pinions and racks to engage and disengage, a pin carried by the shifting bar arranged to be engaged by said latch, a total key, a swinging lever arranged to engage the shifting bar to advance it to engage the pinions and racks, means for swinging said lever to advance the bar and engage the pinions and racks by the depression of the total key stem, said shifting bar being swung on depression of the total key to position for engagement with said latch on advancement of the pitman, whereby on retraction of the pitman the shifting bar will be retracted to separate the pinions and racks, means for holding the total key depressed until the final portion of the return of the pitman, and means connected with the total key for causing the latch to disengage the shifting bar after initial retraction of the pitman.

15. In a calculator, the combination with accumulating mechanism including rack bars and numeral pinions, of a pitman arranged to reciprocate at each operation of the prime mover, a shifting bar arranged to cause the pinions and racks to engage and disengage, engaging means between the shifting bar and the pitman comprising a lug on one member arranged to engage two shoulders on the other member whereby to move the shifting bar and pinions at the end of the forward stroke and of the return stroke of the pitman, a sub-total key, means arranged to be engaged by the sub-total key when depressed to first move the said lug and shoulders out of position for engagement and to thereupon move the shifting bar to engage the pinions and racks, said latter means being disconnected at the latter portion of the advance of the pitman whereby the shifting bar and pitman will have the lug and shoulders returned to position for engagement, and at the end of its return stroke the pitman will move the shifting bar to separate the pinions and rack bars, said means for moving the shifting bar by the sub-total key being arranged to remain disconnected upon retention of the said key depressed after return of the parts, whereby subsequent operation of the pitman after return of the prime mover and other parts to normal positions during retention of the key depressed will cause the normal movement of the shifting bar through the lug and shoulders, and will prevent derangement of any of the parts.

16. In a calculator, the combination with accumulating mechanism including racks and numeral pinions, of a pitman arranged to reciprocate at each operation of the prime mover, a latch carried by the pitman, a shifting bar arranged to cause the pinions and racks to engage and disengage, a pin carried by the shifting bar arranged to be engaged by said latch, a total key stem, a swinging lever arranged to engage the shifting bar to advance it to shift the pinions relatively, means for swinging said lever to advance the bar and engage the pinions and racks by the depression of the total key stem, said shifting bar being swung on depression of the total key stem to position for engagement with said latch on advancement of the pitman, whereby on retraction of the pitman the shifting bar will be retracted to separate the pinions and racks, means for holding the total key stem depressed until the final portion of the return of the pitman, means connected with the total key for causing the latch to disengage the shifting bar after initial retraction of the pitman, a sub-total key stem arranged to engage said swinging lever when depressed to advance the shifting bar and engage the pinions and racks, and also move the shifting bar to bring its pin in position for engagement with the said latch on advancement of the pitman, means for causing the shifting bar on advance of the pitman to move its said pin out of position for engagement with said latch, whereby the shifting bar is not moved on initial retraction of the pitman, and means for moving the shifting bar at the final portion of the retraction of the pitman to disengage the pinions and racks, said means comprising a direct connection between the shifting bar and the pitman in the form of a lug on one member engaging shoulders on the other member, said shoulders being arranged to engage the lug in the normal position of the shifting bar to cause engagement of the pinions and racks at the final portion of the pitman advance, and to cause disengagement of the pinions and racks at the final portion of the pitman retraction.

17. In a calculator, the combination with accumulating mechanism including racks and numeral pinions, of a pitman arranged to reciprocate at each operation of the prime mover, a shifting bar arranged to cause the pinions and racks to engage and disengage, a total key stem, a swinging lever arranged to engage the shifting bar to advance it to engage the pinions and racks, means for swinging said lever by the depression of the total key stem to advance the bar and engage the pinions and racks, engaging means between the shifting bar and the pitman comprising a lug on one member engaging shoulders on the other member, said lug and shoulders being arranged to cause the advance of the shifting bar at the final portion of the forward stroke of the pitman and also the retraction of the shifting bar at the final portion of the return of the pitman, said shifting bar being swung on depression of the total key stem to move the lug and shoulders out of position for engagement, and means controlled by the depression of the total key stem for causing connection between the pitman and the shifting bar on initial retraction of the pitman to thereby separate the pinions and racks at such stage, said connection being released after initial retraction of the pitman.

18. In a calculator, the combination with accumulating mechanism including racks and numeral pinions, of a pitman arranged to reciprocate at each operation of the prime mover, a shifting bar arranged to cause the pinions and racks to engage and disengage, a total key stem, a swinging lever arranged to engage the shifting bar to advance it to engage the pinions and racks, means for swinging said lever to advance the bar and engage the pinions and racks by the depression of the total key stem, engaging means between the shifting bar and the pinion comprising a lug on one member engaging shoulders on the other member, said lug and shoulders being arranged to cause the advance of the shifting bar at the final portion of the forward stroke of the pitman and also the retraction of the shifting bar at the final portion of the return of the pitman, said shifting bar being swung on depression of the total key stem to move the lug and shoulders out of position for engagement, means controlled by the depression of the total key stem for causing engagement between the pitman and the shifting bar on initial retraction of the pitman to thereby separate the pinions and racks at such stage, said means being released after initial retraction of the pitman, means for locking the total key depressed, and means for releasing the total key at the final portion of the retraction of the pitman.

19. In a calculator, the combination with accumulating mechanism including racks and numeral pinions, of a pitman arranged to reciprocate at each operation of the prime mover, a shifting bar arranged to cause the pinions and racks to engage and disengage, a total key stem, a swinging lever arranged to engage the shifting bar to advance it to engage the pinions and racks, means for swinging said lever to advance the bar and engage the pinions and racks by the depression of the total key stem, engaging means between the shifting bar and the pinion comprising a lug on one member engaging shoulders on the other member, said lug and shoulders being arranged to cause the advance of the shifting bar at the final portion of the forward stroke of the pitman and also the retraction of the shifting bar at the final portion of the return of the pitman, said shifting bar being swung on depression of the total key stem to move the lug and shoulders out of position for engagement, means controlled by the depression of the total key stem for causing engagement between the pitman and the shifting bar on initial retraction of the pitman to thereby separate the pinions and racks at such stage, said means being released after initial retraction of the pitman, the connection between the total key and the means for advancing the shifting bar thereby being disabled on advance of the pitman and remaining disabled upon retention of the total key depressed by external means whereby subsequent operation of the prime mover and pitman with the total key still depressed will not cause abnormal operation or derangement of the parts.

20. In a calculator, the combination with accumulating mechanism including racks and numeral pinions, of a pitman arranged to reciprocate at each operation of the prime mover, a shifting bar arranged to cause the pinions and racks to engage and disengage, a total key, a swinging lever arranged to engage the shifting bar to advance it to engage the pinions and racks, means for swinging said lever to advance the bar and engage the pinions and racks by the depression of the total key, engaging means between the shifting bar and the pitman comprising a lug on one member engaging shoulders on the other member, said lug and shoulders being arranged to cause the advance of the shifting bar at the final portion of the forward stroke of the pitman and also the retraction of the shifting bar at the final portion of the return of the pitman, said shifting bar being swung on depression of the total key to move the lug and shoulders out of position for engagement, means controlled by the depression of the total key for causing connection between the pitman and the shifting bar on initial retraction of the pitman to thereby separate the pinions and racks at such stage, said connection being disabled after initial retraction of the pitman whereby on retention of the total key depressed by external means, the subsequent reciprocation of the pitman will not cause movement by the pitman of the shifting bar at the initial return movement of the pitman.

21. In a calculator, the combination with accumulating mechanism including racks and numeral pinions, of a pitman arranged to reciprocate at each operation of the prime mover, a latch carried by the pitman, a shifting bar arranged to cause the pinions and racks to engage and disengage, a pin carried by the shifting bar arranged to be engaged by said pitman latch, a total key, a swinging lever arranged to engage the shifting bar to advance it to engage the pinions and racks, means for swinging said lever by the depression of the total key, to advance the bar and engage the pinions and racks, the shifting bar being swung on depression of the total key stem to position for engagement with said latch on advancement of the pitman, whereby on retraction of the pitman the shifting bar will be retracted to separate the pinions and racks and on retention of the total key depressed by external means upon subsequent operation of the pitman the shifting bar is prevented from engagement with the pitman latch and hence not retracted thereby.

22. In a calculator, the combination with accumulating mechanism including rack bars and numeral pinions, of a pitman arranged to reciprocate at each operation of the prime mover, a shifting bar arranged to cause the pinions and racks to engage and disengage, engaging means between the shifting bar and the pitman comprising a lug on one member arranged to engage two shoulders on the other member whereby to move the shifting bar and pinions at the end of the forward stroke and of the return stroke of the pitman, a sub-total key, means arranged to be engaged by the sub-total key when depressed to first move the said lug and shoulders out of position for engagement and to thereupon move the shifting bar to engage the pinions and racks, said latter means being disconnected at the latter portion of the advance of the pitman whereby the shifting bar and pitman will have the lug and shoulders returned to position for engagement, and at the end of its return stroke the pitman will move the shifting bar to separate the pinions and racks.

23. In a calculator, the combination with accumulating mechanism including racks and numeral pinions, of a pitman arranged to reciprocate at each operation of the prime mover, a latch carried by the pitman, a shifting bar arranged to cause the pinions and racks to engage and disengage, a pin carried by the shifting bar arranged to be engaged by said latch, a total key stem, a swinging lever arranged to engage the shifting bar to advance it to shift the pinions relatively, means for swinging said lever to advance the bar and engage the pinions and racks by the depression of the total key stem, said shifting bar being swung on depression of the total key stem to position for engagement with said latch on advancement of the pitman, whereby on retraction of the pitman the shifting bar will be retracted to separate the pinions and racks, means for holding the total key stem depressed until the final portion of the return of the pitman, means connected with the total key for causing the latch to disengage the shifting bar after initial retraction of the pitman, a sub-total key stem arranged to engage said swinging lever when depressed to advance the shifting bar and engage the pinions and racks and also arranged to move the shifting bar to bring its pin to position for engagement with the said latch on advancement of the pitman, means for causing the shifting bar on advance of the pitman to move its said pin out of position for engagement with said latch, whereby the shifting bar is not moved on retraction of the pitman, and means for moving the shifting bar at the final portion of the retraction of the pitman to disengage the pinions and racks.

24. In a calculator, the combination with accumulating mechanism including racks and numeral pinions, of a pitman arranged to reciprocate at each operation of the prime mover, a shifting bar arranged to move the pinions and racks to engage and disengage, a connection between the shifting bar and the pitman comprising a lug on one member arranged to engage shoulders on the other member to shift the pinions at the end of the forward and return strokes of the pitman, a latch carried by the pitman, a pin on the shifting bar arranged to be engaged by said latch, a swinging lever, a stop arm movable on the lever, a total key arranged to engage said stop arm when depressed to move the lug and shoulders away from position for engagement, and also shift said lever and advance the shifting bar to separate the pinions and racks, said stop arm being swung by engagement with the pitman at the end of its forward stroke whereby to release the arm and lever from the said key and permit retraction of the lever, said shifting bar being thereby released from said arm, an abutment member on the total key arranged to engage the shifting bar and hold it depressed upon its said advancement by said lever and the retraction of said arm whereby said latch will engage the pin on the shifting bar at the end of the forward stroke of the pitman to retract the shifting bar during the initial return stroke of the pitman, said shifting bar being released from the key abutment on said initial return of the pitman and permitted to swing up away from said latch, said abutment member being yieldable on the key to permit advancement of the shifting bar during abnormal depression of the total key.

25. In a calculator, the combination with accumulating mechanism including racks and numeral pinions, of a pitman arranged to reciprocate at each operation of the prime mover, a shifting bar arranged to move the pinions and racks to engage and disengage, a connection between the shifting bar and the pitman comprising a lug on one member arranged to engage shoulders on the other member to shift the pinions at the end of the forward and return strokes of the pitman, a latch carried by the pitman, a pin on the shifting bar arranged to be engaged by said latch, a swinging lever, a stop arm movable on the lever, a total key arranged to engage said stop arm when depressed to move the lug and shoulders away from position for engagement, and also shift said lever and advance the shifting bar to separate the pinions and racks, said stop arm being swung by engagement with the pitman at the end of its forward stroke whereby to release the arm and lever from the said key and permit retraction of the lever, said shifting bar being thereby released from said arm, an abutment member on the total key arranged to engage the shifting bar and hold it depressed upon its said advancement by said lever and the retraction of said arm whereby said latch will engage the pin on the shifting bar at the end of the forward stroke of the pitman to retract the shifting bar during the initial return stroke of the pitman, said shifting bar being released from the key abutment on said initial return of the pitman and permitted to swing up away from said latch.

26. In a calculator, the combination with accumulating mechanism including racks and numeral pinions, of a pitman arranged to reciprocate at each operation of the prime mover, a shifting bar arranged to cause the pinions and rack bars to engage and disengage, a connection between the shifting bar and the pitman comprising a lug on one member arranged to engage shoulders on the other member to shift the pinions at the end of the forward and return strokes of the pitman, a latch carried by the pitman, a pin on the shifting bar arranged to be engaged by said latch, a swinging lever, a stop arm movable on the lever, a total key arranged to engage said arm when depressed to move the lug and shoulders away from position for engagement and also to shift said lever and advance the shifting bar to separate the pinions and racks, said stop arm being swung by engagement with the pitman at the end of its forward stroke whereby to release the lever from the said key and permit retraction of the lever, said shifting bar being thereby released from said stop arm, an abutment member on the total key arranged to engage the shifting bar and hold it depressed upon its said advancement by said lever and the retraction of said arm whereby to cause said latch to engage the pin on the shifting bar at the end of the forward stroke of the pitman and retract the shifting bar during the initial return stroke of the pitman, said shifting bar being released from the key abutment on said initial return of the pitman and permitted to swing up away from said latch, a sub-total key arranged to engage said lever arm on depression to first swing the shifting bar to move the lug and shoulders out of position for engagement and to thereupon swing the lever to advance the shifting bar to engage the pinions and racks, said lever arm being engaged by the pitman at the end of its advance to move the arm away from the sub-total key and permit retraction of the lever and also of the shifting bar to normal position, whereby engagement of the said latch with the shifting bar is prevented, and engagement of the lug and one shoulder is permitted at the final portion of the retraction of the pitman.

27. In a calculator, the combination with accumulating mechanism including racks and numeral pinions, of a pitman arranged to reciprocate at each operation of the prime mover, a shifting bar arranged to cause the pinions and rack bars to engage and disengage, a connection between the shifting bar and the pitman comprising a lug on one member arranged to engage shoulders on the other member to shift the pinions at the end of the forward and return strokes of the pitman, a latch carried by the pitman, a pin on the shifting bar arranged to be engaged by said latch, a swinging lever, a stop arm movable on the lever, a total key arranged to engage said arm when depressed to move the lug and shoulders away from position for engagement and also to shift said lever and advance the shifting bar to separate the pinions and racks, said stop arm being swung by engagement with the pitman at the end of its forward stroke whereby to release the lever from the said key and permit retraction of the lever, said shifting bar being thereby released from said stop arm, an abutment member on the total key arranged to engage the shifting bar and hold it depressed upon its said advancement by said lever and the retraction of said arm whereby to cause said latch to engage the pin on the shifting bar at the end of the forward stroke of the pitman and retract the shifting bar during the initial return stroke of the pitman, said shifting bar being released from the key abutment on said initial return of the pitman and permitted to swing up away from said latch, a sub-total key arranged to engage said lever arm on depression to first swing the shifting bar to move the lug and shoulders out of position for engagement and to thereupon swing the lever to advance the shifting bar to engage the pinions and racks, said lever arm being engaged by the pitman at the end of its advance to move the arm away from the sub-total key and permit retraction of the lever and also of the shifting bar to normal position, whereby engagement of the said latch with the shifting bar is prevented, and engagement of the lug and one shoulder is permitted at the final portion of the retraction of the pitman, said stop arm and connected lever remaining with the lever in normal position on retention of the total key or the sub-total key depressed by external means whereby upon subsequent actuation of the pitman during the depression of either of said keys no abnormal movements or derangements of the parts will result.

28. In a calculator, the combination with accumulating mechanism including racks and numeral pinions, of a pitman arranged to reciprocate at each operation of the prime mover, a shifting bar arranged to cause the pinions and rack bars to engage and disengage, a connection between the shifting bar and the pitman comprising a lug on one member arranged to engage shoulders on the other member to shift the pinions at the end of the forward and return strokes of the pitman, a latch carried by the pitman, a pin on the shifting bar arranged to be engaged by said latch, a swinging lever, a stop arm movable on the lever, a total key arranged to engage said arm when depressed to move the key and shoulder away from position for engagement and also to shift said lever and advance the shifting bar to separate the pinions and racks, said stop arm being swung by engagement with the pitman at the end of its forward stroke whereby to release the lever from the said key and permit retraction of the lever, said shifting bar being thereby released from said stop arm, an abutment member on the total key arranged to engage the shifting bar and hold it depressed upon its said advancement by said lever and the retraction of said arm whereby to cause said latch to engage the pin on the shifting bar at the end of the forward stroke of the pitman and retract the shifting bar during the initial return stroke of the pitman, said shifting bar being released from the key abutment on said initial return of the pitman and permitted to swing up away from said latch, a sub-total key arranged to engage said lever arm on depression to first swing the shifting bar to move the lug and shoulders out of position for engagement and to thereupon swing the lever to advance the shifting bar to engage the pinions and racks, said lever arm being engaged by the pitman at the end of its advance to move the arm away from the sub-total key and permit retraction of the lever and also of the shifting bar to normal position, whereby engagement of the said latch with the shifting bar is prevented, and engagement of the lug and one shoulder is permitted at the final portion of the retraction of the pitman, and means for retaining the total key and sub-total key depressed until the final part of the retraction of the pitman.

29. In a calculator, the combination with accumulating mechanism including racks and numeral pinions, of a pitman arranged to reciprocate at each operation of the prime mover, a shifting bar arranged to cause the pinions and rack bars to engage and disengage, a connection between the shifting bar and the pitman comprising a lug on one member arranged to engage shoulders on the other member to shift the pinions at the end of the forward and return strokes of the pitman, a latch carried by the pitman, a pin on the shifting bar arranged to be engaged by said latch, a swinging lever, a stop arm movable on the lever, a sub-total key stem arranged to engage said lever arm on depression to first swing the shifting bar to move the lug and shoulders out of position for engagement and to thereupon swing the lever to advance the shifting bar to engage the pinions and racks, said lever arm being engaged by the pitman at the end of its advance to move the arm away from the sub-total key stem and permit retraction of the lever and also of the shifting bar to normal position, whereby engagement of the said latch with the shifting bar is prevented, and engagement of the lug and one shoulder is permitted at the final portion of the retraction of the pitman.

30. In a calculator, the combination with accumulating mechanism including rack bars, numeral pinions, and printing means, of means for causing engagement and disengagement of the pinions and rack bars during the normal operation of the machine to accumulate, and total mechanism including a total key that will change the timing of the said engagement and disengagement of the pinions and rack bars upon actuation of the prime mover, said mechanism including means for disconnecting parts of the total mechanism and printing means whereby upon the total key being retained depressed on completion of a total operation and return of the prime mover and other parts to normal positions and held depressed during the subsequent operation of the prime mover, no impression of the printing means will be made.

31. In a calculator, the combination with accumulating mechanism including rack bars, numeral pinions, and printing means for printing numbers and adjacent signals, of means for causing engagement and disengagement of the pinions and rack bars during the normal operation of the machine to accumulate, and total mechanism including a total key that will change the timing of the said engagement and disengagement of the pinions and rack bars upon actuation of the prime mover, said mechanism including means for disconnecting parts of the total mechanism and printing means whereby upon the total key being retained depressed on completion of a total operation and during the subsequent operation of the prime mover, no impression of the printing means will be made.

32. In a calculator, the combination with accumulating mechanism including rack bars, numeral pinions, and printing means, of means for causing engagement and disengagement of the pinions and rack bars during the normal operation of the machine to accumulate, and sub-total mechanism including a sub-total key that will change the timing of the said engagement and disengagement of the pinions and rack bars upon actuation of the prime mover to effect the sub-total operation, said mechanism including means for disconnecting parts of the sub-total mechanism and printing means whereby upon the sub-total key being retained depressed on completion of a sub-total operation and during the subsequent operation of the prime mover, no impression of the printing means will be made.

33. In a calculator, the combination with accumulating mechanism including rack bars, numeral pinions, and printing means for printing numbers and adjacent signals, of means for causing engagement and disengagement of the pinions and rack bars during the normal operation of the machine to accumulate, and sub-total mechanism including a sub-total key that will change the timing of the said engagement and disengagement of the pinions and rack bars upon actuation of the prime mover to effect the sub-total operation, said mechanism including means for disconnecting parts of the sub-total mechanism and printing means whereby upon the sub-total key being retained depressed on completion of a sub-total operation and during the subsequent operation of the prime mover, no impression of the printing means will be made.

34. In a calculator, the combination with accumulating mechanism including racks and numeral pinions, of a pitman arranged to reciprocate at each operation of the prime mover, a shifting bar arranged to cause the pinions and racks to engage and disengage, a connection between the shifting bar and the pitman comprising a lug on one member arranged to engage shoulders on the other member to shift the pinions at the end of the forward and return strokes of the pitman, a swinging lever, a total key arranged to engage said bar when depressed to move the lug and shoulders away from position for engagement and also to shift said lever and advance the shifting bar to separate the pinions and racks, and a non-add key having a connection with the said shifting bar for retaining the shifting bar with the said lug and shoulders out of position for engagement on depression of the non-add key.

35. In a calculator, the combination with accumulating mechanism including racks and numeral pinions, of a pitman arranged to reciprocate at each operation of the prime mover, a shifting bar arranged to cause the pinions and racks to engage and disengage, a connection between the shifting bar and the pitman comprising a lug on one member arranged to engage shoulders on the other member to shift the pinions at the end of the forward and return strokes of the pitman, a swinging lever, a total key arranged to engage said bar when depressed to move the lug and shoulders away from position for engagement and also to shift said lever and advance the shifting bar to separate the pinions and racks, and a non-add key having a connection with the said shifting bar adapted on depression for retaining the shifting bar with the said lug and shoulders out of position for engagement, until the final portion of the forward stroke of the pitman when the shifting bar is released from said key.

36. In a calculator, the combination with accumulating mechanism including racks and numeral pinions, of a pitman arranged to reciprocate at each operation of the prime mover, a shifting bar arranged to cause the pinions and racks to engage and disengage, a connection between the shifting bar and the pitman comprising a lug on one member arranged to engage shoulders on the other member to shift the pinions at the end of the forward and return strokes of the pitman, a swinging lever, a total key arranged to engage said bar when depressed to move the lug and shoulders away from position for engagement and also to shift said lever and advance the shifting bar to separate the pinions and racks, a non-add key having a connection with the said shifting bar for retaining the shifting bar with the said lug and shoulders out of position for engagement, said non-add key having a separable portion, and means to engage such portion at the final part of the advance of the pitman whereby to release the shifting bar from the key.

37. In a calculator, the combination with accumulating mechanism including rack bars, numeral pinions, item keys with connections for controlling the advance of the rack bars, and latch plates for locking the rack bars normally against movement except on operation of the item keys whereby to release the corresponding rack bars, of a sub-total key in connection with means for controlling the relative movement of the rack bars and adding pinions to retain the pinions and rack bars engaged until the final part of the return stroke to produce the sub-total operation, and means arranged to cause the shifting of all of the latch plates to effect the release of the rack bars therefrom at once on depression of the sub-total key, and previous to operation of the prime mover of the machine.

38. In a calculator, the combination with accumulating mechanism including rack bars, numeral pinions, item keys with connections for controlling the advance of the rack bars, and latch plates for locking the rack bars normally against movement except on operation of the item keys whereby to release the corresponding rack bars, of a sub-total key in connection with means for controlling the engagement of the rack bars and adding pinions to retain the pinions and rack bars engaged until the final part of the return stroke to produce the sub-total operation, which means is operative to shift the pinions into engagement with the rack bars at once on depression of the sub-total key and previous to operation of the prime mover of the machine, and means connected with the said sub-total means arranged to shift all of the latch plates to release all of the rack bars therefrom at once on the depression of the sub-total key and previous to operation of the prime mover.

39. In a calculator, the combination with accumulating mechanism including rack bars, numeral pinions, item keys with connections for controlling the advance of the rack bars, and latch plates for locking the rack bars normally against movement, of a shifting bar connected with the pinions for moving them to engage and disengage the rack bars, a pitman arranged to reciprocate at each operation of the machine, engaging means between the pitman and the shifting bar to cause engagement and separation of the pinions and rack bars at the end of the forward and return strokes of the pitman respectively, a total key having connections for engaging the shifting bar to cause engagement of the pinions and rack bars at once on depression of the total key, a lever carried by the shifting bar, and means connected with said lever to shift all of the latch plates to release the rack bars at once on advancement of the shifting bar by the total key.

40. In a calculator, the combination with accumulating mechanism including rack bars, numeral pinions, item keys with connections for controlling the advance of the rack bars, and latch plates for locking the rack bars normally against movement, of a shifting bar connected with the pinions for moving them to engage and disengage the rack bars, a pitman arranged to reciprocate at each operation of the machine, engaging means between the pitman and the shifting bar to cause engagement and separation of the pinions and rack bars at the end of the forward and return strokes of the pitman respectively, a sub-total key having connections for engaging the shifting bar to cause engagement of the pinions and rack bars at once on depression of the sub-total key, a lever carried by the shifting bar, and means connected with said lever to shift all of the latch plates to release the rack bars at once on advancement of the shifting bar by the sub-total key.

41. In a calculator, the combination with accumulating mechanism including rack bars, numeral pinions, item keys with connections for controlling the advance of the rack bars, and latch plates for locking the rack bars normally against movement, of a shifting bar connected with the pinions for moving them to engage and disengage the rack bars, a pitman arranged to reciprocate at each operation of the machine, engaging means between the pitman and the shifting bar to cause engagement and separation of the pinions and rack bars at the end of the forward and return strokes of the pitman respectively, a total key having connections for engaging the shifting bar to cause engagement of the pinions and rack bars at once on depression of the total key, a lever carried by the shifting bar, and means connected with said lever to shift all of the latch plates to release the rack bars at once on advancement of the shifting bar by the total key, said lever on the shifting bar being engaged by the advance of the pitman upon prior advance of the shifting bar by the total key to release the latch plates.

42. In a calculator, the combination with accumulating mechanism including rack bars, numeral pinions, item keys with connections for controlling the advance of the rack bars, and latch plates for locking the rack bars normally against movement, of a shifting bar connected with the pinions for moving them to engage and disengage the rack bars, a pitman arranged to reciprocate at each operation of the machine, engaging means between the pitman and the shifting bar to cause engagement and separation of the pinions and rack bars at the end of the forward and return strokes of the pitman respectively, a total key having connections for engaging the shifting bar to cause engagement of the pinions and rack bars at once on depression of the total key, a lever carried by the shifting bar, and means connected with said lever to shift all of the latch plates to release the rack bars at once on advancement of the shifting bar by the total key, said lever being engaged by the pitman on advance of the pitman prior to movement of the shifting bar whereby to swing the lever and disconnect it to prevent release of the latch plates on subsequent movement of the shifting bar.

43. In a calculator, the combination with accumulating mechanism including rack bars, numeral pinions, item keys with connections for controlling the advance of the rack bars, and latch plates for locking the rack bars normally against movement, of a shifting bar having connections with the numeral pinions to cause them to engage and disengage the rack bars, a total key, means for moving the shifting bar at once on depression of the total key to engage the pinions and rack bars, a pitman arranged to reciprocate, a swinging lever on the shifting bar, a shutter arranged to engage all of the latch plates, said shutter having means for engagement with said lever whereby on advance of the shifting bar the shutter will swing to release the latch plates.

44. In a calculator, the combination with accumulating mechanism including rack bars, numeral pinions, item keys with connections for controlling the advance of the rack bars, and latch plates for locking the rack bars normally against movement, a shifting bar having connections with the numeral pinions to cause them to engage and disengage the rack bars, a total key, means for moving the shifting bar at once on depression of the total key to engage the pinions and rack bars, a pitman arranged to reciprocate, a swinging lever on the shifting bar, a shutter arranged to engage all of the latch plates, said shutter having means for engagement with said lever whereby on advance of the shifting bar the shutter will swing to release the latch plates, said lever being shifted on advance of the pitman after movement of the shifting bar, to release the latch plates.

45. In a calculator, the combination with accumulating mechanism including rack bars, numeral pinions, item keys with connections for controlling the advance of the rack bars, and latch plates for locking the rack bars normally against movement, a shifting bar having connections with the numeral pinions to cause them to engage and disengage the rack bars, a total key, means for moving the shifting bar at once on depression of the total key to engage the pinions and rack bars, a pitman arranged to reciprocate, a swinging lever on the shifting bar, a shutter arranged to engage all of the latch plates, said shutter having means for engagement with said lever whereby on advance of the shifting bar the shutter will swing to release the latch plates, said lever being swung on advance of the pitman prior to movement of the shifting bar to disconnect the lever and prevent movement of the shutter thereby.

46. In a calculator, the combination with accumulating mechanism including rack bars and numeral pinions, of means for locking the rack bars normally against movement, a sub-total key in connection with means for controlling the engagement of the rack bars and adding pinions to retain the pinions and rack bars engaged until the final part of the return stroke to produce the sub-total operation, which means is operative to shift the pinions into engagement with the rack bars at once on depression of the sub-total key and previous to operation of the prime mover of the machine, and means connected with the said sub-total means arranged to shift all of said locking means to release all of the rack bars therefrom at once on the depression of the sub-total key and previous to operation of the prime mover.

47. In a calculator, the combination with accumulating means including rack bars and numeral pinions, of a shifting bar arranged to normally cause the engagement and disengagement of the pinions and rack bars, a total key, a sub-total key, in combination with means arranged to retain the rack bars and pinions engaged until the latter part of the operation of the machine, both of said keys being arranged to move the shifting bar at once on their depression to engage the pinions with the rack bars, means arranged to normally lock the rack bars against movement, and means connected with said shifting bar arranged whereby on depression of either of said keys the rack bars will be released from the locking means.

WITSEL R. DE CAMP.
HERBERT BURDICK.
JAMES H. DOOLEY.

Copies of this patent may be obtained for five cents each, by addressing the "Commissioner of Patents, Washington, D. C."